Aug. 4, 1964

R. PITTMAN 3,142,991

FLUID ROTOR SENSOR

Filed Aug. 8, 1960

*INVENTOR.*
ROLAND PITTMAN

BY *Ernest L. Brown*
ATTORNEY

Aug. 4, 1964   R. PITTMAN   3,142,991
FLUID ROTOR SENSOR

Filed Aug. 8, 1960   10 Sheets-Sheet 2

INVENTOR.
ROLAND PITTMAN
BY

ATTORNEY

INVENTOR.
ROLAND PITTMAN
BY
ATTORNEY

Aug. 4, 1964   R. PITTMAN   3,142,991
FLUID ROTOR SENSOR

Filed Aug. 8, 1960   10 Sheets-Sheet 7

INVENTOR.
ROLAND PITTMAN
BY *Ernest L. Brown*
ATTORNEY

Aug. 4, 1964 R. PITTMAN 3,142,991
FLUID ROTOR SENSOR
Filed Aug. 8, 1960 10 Sheets-Sheet 10

INVENTOR.
ROLAND PITTMAN
BY Ernest L. Brown
ATTORNEY

United States Patent Office 3,142,991
Patented Aug. 4, 1964

3,142,991
FLUID ROTOR SENSOR
Roland Pittman, Grand Rapids, Mich., assignor, by mesne assignments, to Lear Siegler, Inc., Santa Monica, Calif., a corporation of Delaware
Filed Aug. 8, 1960, Ser. No. 48,305
20 Claims. (Cl. 73—504)

This invention pertains to means for detecting the angular velocity and to means for detecting the linear acceleration of a body.

Gyroscopes, which have heretofore been used to detect angular velocities require extreme came in their manufacture to eliminate mass unbalance, dirt, and misalignment of the parts.

The device of this invention is insensitive to a moderate amount of dirt. Mass unbalance does not affect the operation of the device of this invention nor reduce its accuracy.

It is therefore an object of this invention to provide novel means for measuring the angular velocity of a supporting structure.

It is another object of this invention to provide means for measuring the linear acceleration of a supporting structure.

It is a more particular object of this invention to provide means utilizing a rotating chamber enclosing a liquid material and enclosing a sensing device which is adapted to sense the flow of fluid within said chamber in response to angular velocities about axes perpendicular to the spin axis of said chamber.

It is also a particular object of this invention to provide means utilizing a rotating chamber which contains two fluids which are separated by a diaphragm and means for sensing deflection of said diaphragm in response to acceleration of a supporting structure.

Other objects will become apparent from the following description when taken in connection with the accompanying drawings, in which.

Figure 1:
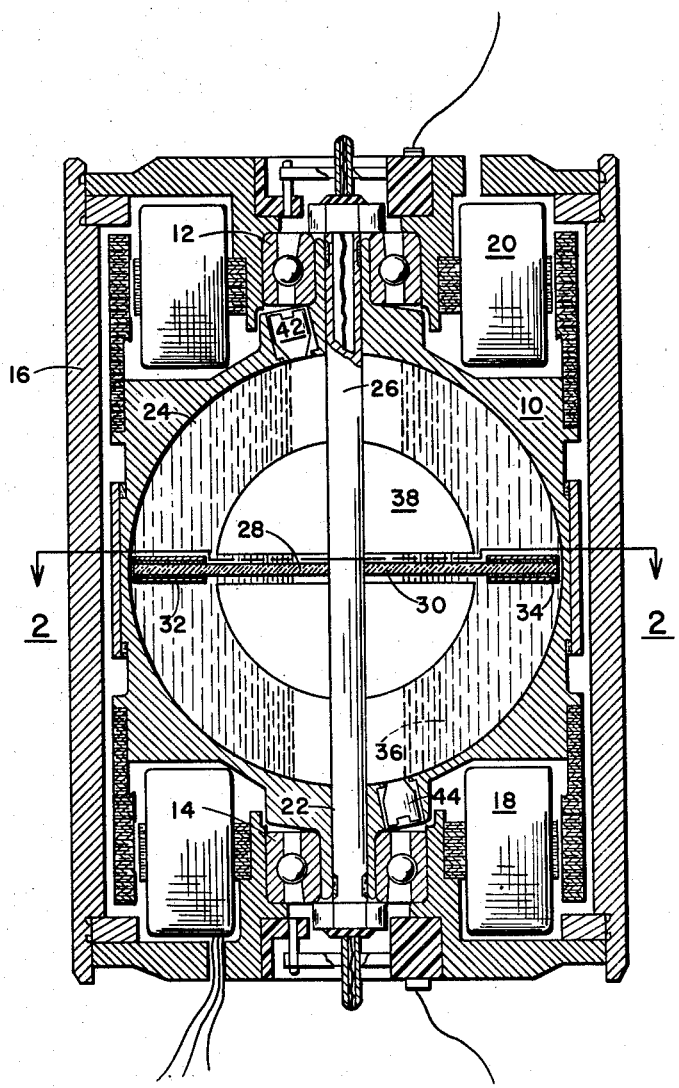
FIGURE 1 is a view, partially in section and partially in profile, of a first and second embodiment of a fluid rotor sensor of this invention.
Figure 2:
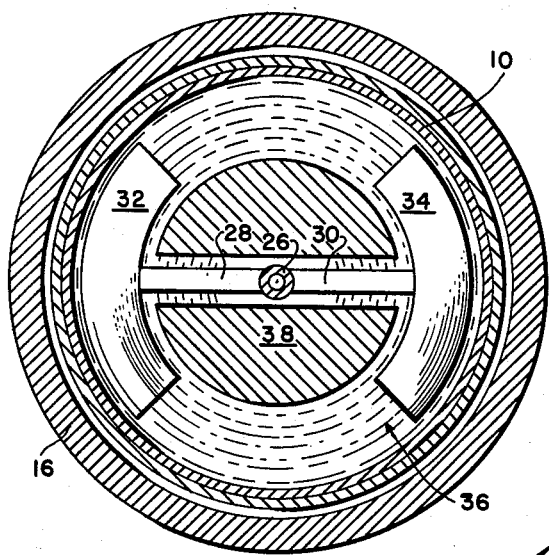
FIGURE 2 is a view, partially in section, taken at 2—2 of FIGURE 1, of the first embodiment of this invention.

In FIGURES 1 and 2, means forming a closed, rotatable chamber 10 is mounted upon bearings 12 and 14 for rotation relative to housing 16. Motor means 18 is adapted to rotate chamber 10. Generator means 20 is adapted to generate a signal which is a measure of the the angular position of chamber 10 about the axis of shaft 22.

Alternatively, means forming chamber 10 may be mounted upon air bearings, journal bearings, or the like rather than upon ball bearings 12 and 14. Further, means forming chamber 10 alternatively may be driven by other prime motive means than an electric motor 18, such as—for example—pneumatic or hydraulic turbines. Instead of a generator 20, a resolver, a potentiometer, a photoelectric pickoff, or other means well known in the art may be utilized to measure the angular position of chamber 10 about the spin axis of shaft 22.

FIGURES 1 and 2 show one preferred embodiment of means forming a chamber 10. The interior wall 24 of means forming a chamber 10 is preferably spherical in shape. A rigid structural axial support member 26 is positioned within chamber 10 along the spin axis thereof. Structural member 26 preferably has a hollow conduit therein which is adapted to carry electrical wires. A pair of cantilevered piezo-electric crystals 28 and 30 are radially oppositely positioned and attached to structural member 26. Crystals 28 and 30 are adapted to support probes 32 and 34, respectively. Crystals 28 and 30 serve a dual purpose of supporting probes 32 and 34 and of detecting the movement of probes 32 and 34.

Probes 32 and 34 are vanes which are annular segments in planes perpendicular to the spin axis of chamber 10. Probes 32 and 34 are shown as approximately 90 degree segments of annular vanes symmetrically disposed relative to crystals 28 and 30.

The interior of chamber 10 is partially filled with a liquid (preferably a heavy liquid such as mercury). The liquid 36 is shown in the position it assumes when chamber 10 is rotating. Of course, if chamber 10 were not rotating the liquid would seek its own level due to the force of gravity. It is to be noted that the interior of spherical chamber 10 is preferably not filled in order to minimize the caging of liquid 36. Further, the portion of the cavity within means forming chamber 10, where the liquid 36 does not excite probes 32 and 34, conveniently may be filled with solid materials such as—for example—solid spherical member 38. Member 38 also may serve as a stop to prevent the overflexing of crystals 28 and 30. Means for filling chamber 10 are shown at 42 and 44.

Figure 3:
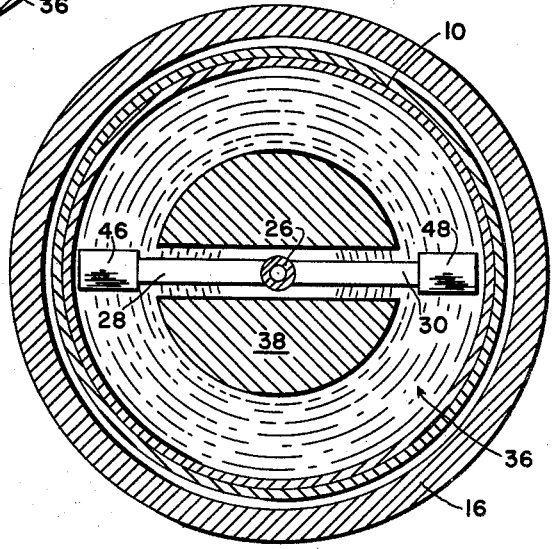
FIGURE 3 is a view, partially in section, taken at 2—2 of FIGURE 1, of the second embodiment of this invention.
Figure 7:
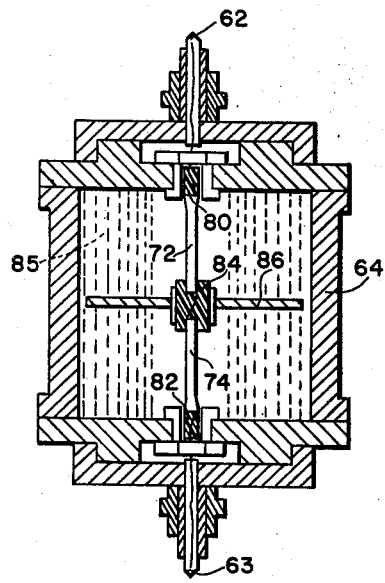
FIGURE 7 is a view, partially in section, of the device of FIGURE 6.
Figure 4:
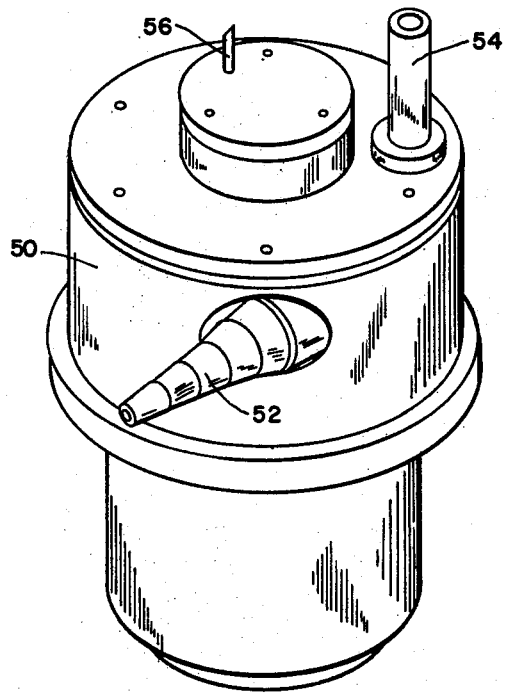
FIGURE 4 is a perspective view of the outer case of a third embodiment of a fluid rotator sensor of this invention.

In FIGURE 3, a different pair of probes 46 and 48 are shown positioned on the ends of crystals 28 and 30, respectively. The probes which are shown in FIGURE 3 are easier to manufacture and position upon the ends of crystals 28 and 30 than those shown in FIGURE 2. The probes 46 and 48 are small right circular cylindrical members whose interior diameter is substantially the same as the exterior diameter of crystals 28 and 30. The exterior surfaces of probes 46 and 48 extend radially outwardly into fluid 36. The mass and size of probes 46 and 48 may be varied to change the natural frequency of response of the probes. It is within the contemplation of this invention that probes 46 and 48 conveniently may be solid members of piezo-electric crystal material which has an exterior surface in the shape of a right circular cylinder.

An embodiment of the device of this invention which utilizes a pair of axially directed piezo-electric crystals to support the sensing structure and which utilizes a turbine to drive the fluid enclosing chamber means is shown in FIGURES 4, 5, 6 and 7. Housing 50 has a pneumatic or hydraulic input port 52 and exit port 54. Electrical contact 56 is connected to a brush 58 on the interior of cap 60 of housing 50 (shown in FIGURE 5). Brush 58 contacts rotatable electrode 62 on the end of rotatable chamber means 64.

Rotatable chamber means 64 has a pair of axially opposing conducting members 62 and 63 on opposite ends thereof. Turbine 66 on the outer periphery of chamber means 64 is positioned in proximity to pneumatic or hydraulic input conduit means 52 which has a nozzle (not shown) upon the inner periphery of housing 50 adapted to drive turbine means 66. It is to be stressed that turbine means 66 and housing 50 could—alternatively—be utilized together with the structure shown and described in connection with FIGURES 1, 2 and 3.

Figure 6:
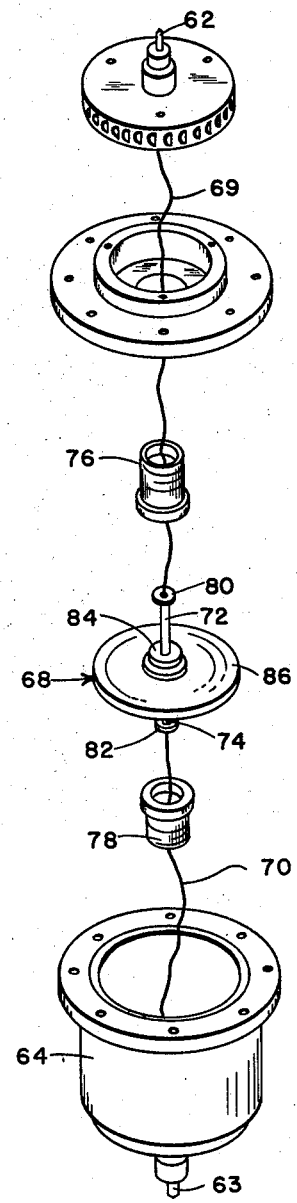
FIGURE 6 is an exploded view of the rotor of FIGURE 5.

Rotatable chamber means 64 is shown in exploded view in FIGURE 6 with the sensing means of this invention shown generally at 68. Rotatable conductors 62 and 63 are electrically connected through conductors 69 and 70 to the axially exterior ends of crystals 72 and 74. Bushings 76 and 78 are adapted to support crystals 72 and 74 through resilient mounting means 80 and 82. The axially interior ends of crystals 72 and 74 are rigidly attached to hub 84 of disc 86. The interior of chamber means 64 is adapted to contain a fluid 85 such as—for example—mercury or the like (shown in FIGURE 7). It is to be noted that although a disc 86 is utilized in FIGURES 4, 5, 6 and 7 that other alternative probes such as that shown in FIGURES 1, 2 and 3 may be utilized in conjunction with axially directed crystals 72 and 74.

Figure 9:
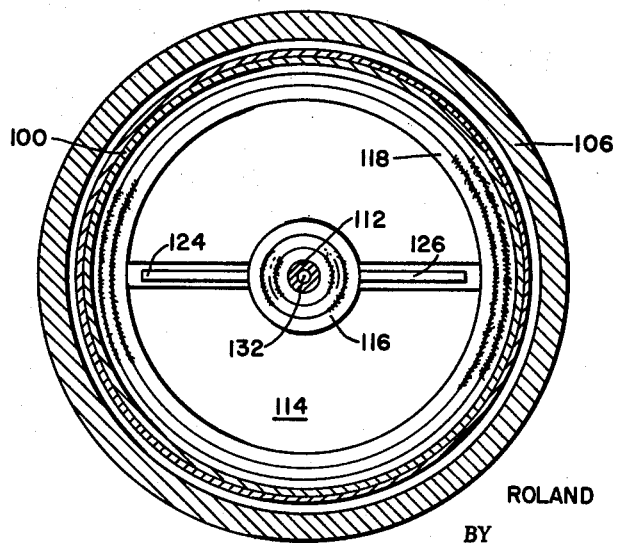
FIGURE 9 is a view, partially in section, taken at 9—9 in FIGURE 8.
Figure 5:
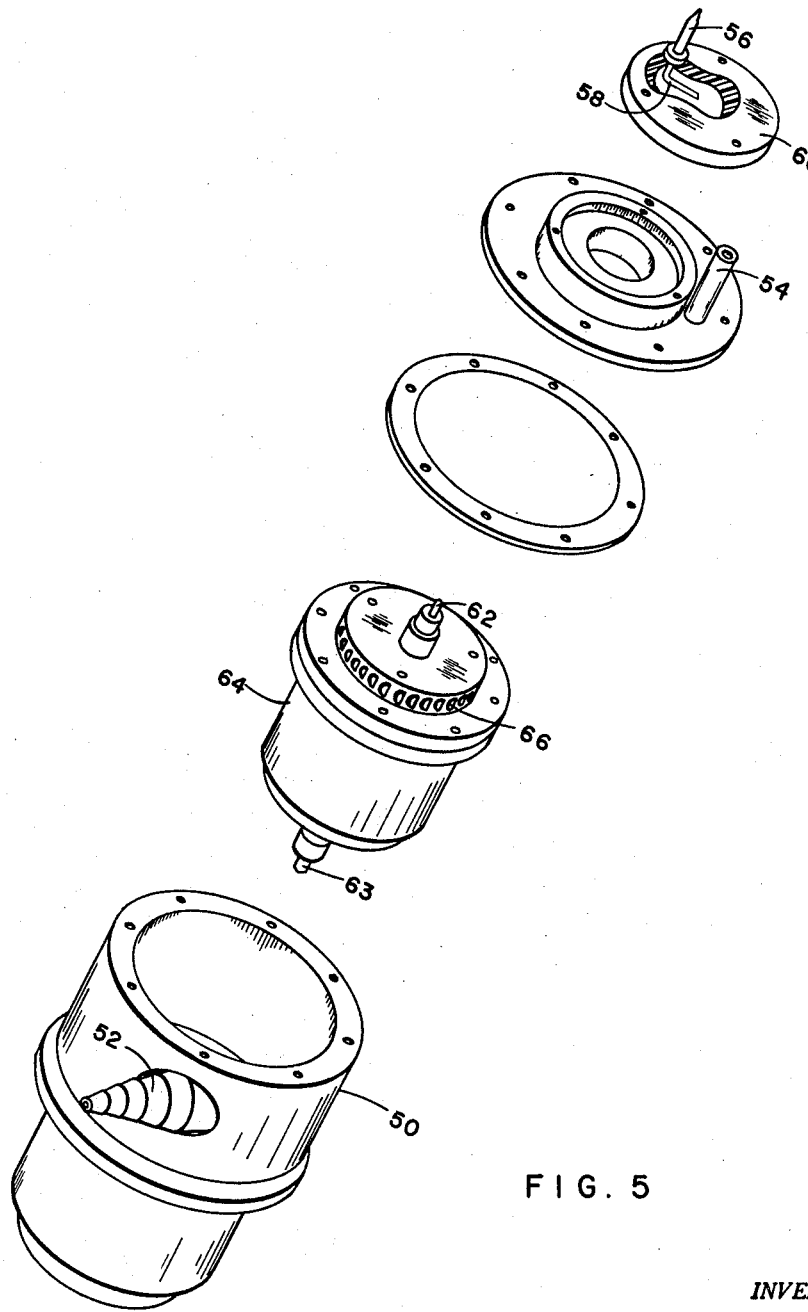
FIGURE 5 is an exploded view of the device of FIGURE 4.
Figure 8:
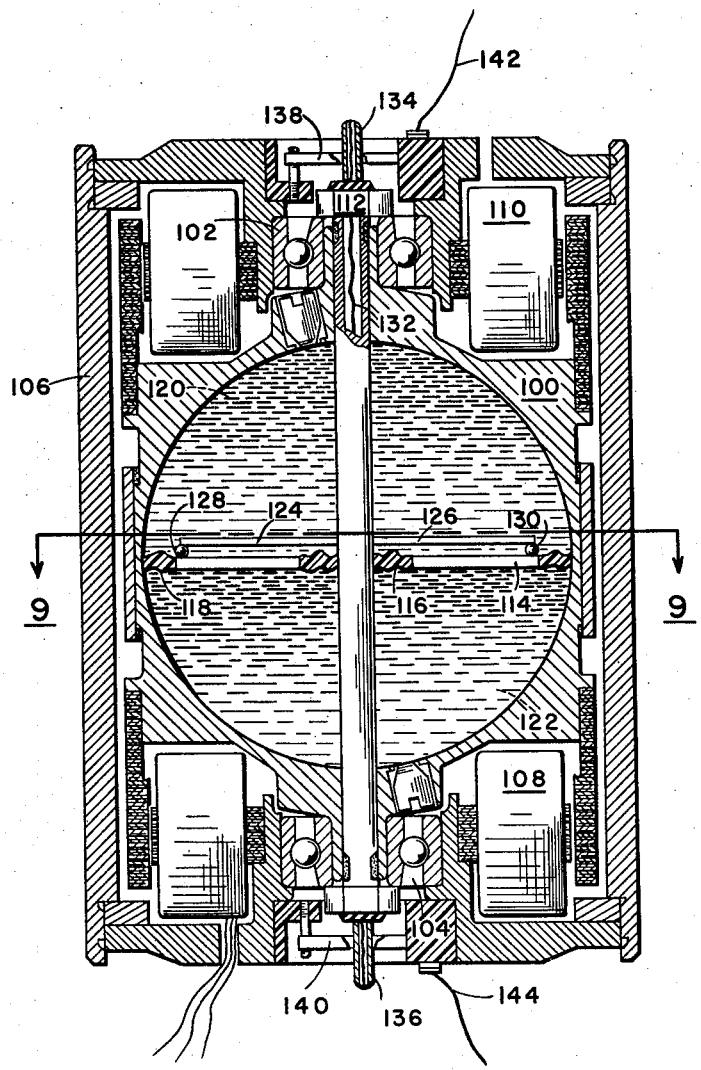
FIGURE 8 is a view, partially in section, of a first embodiment of an accelerometer of this invention.

An embodiment of an accelerometer which is constructed in accordance with this invention is shown in FIGURES 8 and 9. In FIGURES 8 and 9, means forming a spherical rotatable chamber 100 is mounted upon bearings 102 and 104 for rotation relative to housing 106. Chamber means 100 is driven by motor 108 but may—alternatively—be driven by other means such as—for example—pneumatic or hydraulic turbine means. A pickoff device 110 is positioned adjacent the shaft 112 of chamber means 100 to detect the angular position of chamber means 100 about the axis of shaft 112.

The interior of the chamber of chamber means 100 is divided into an upper and lower portion by an annular disc 114 and flexible annular members 116 and 118. The upper portion of the chamber of chamber means 100 is filled with a light fluid 120 such as—for example—oil whereas the lower portion of the chamber means 100 is filled with a heavy fluid 122 such as—for example—mercury.

In FIGURES 8 and 9 a pair of oppositely directed radially extending cantilevered piezo-electric crystals 124 and 126 are connected to shaft 112 and bear upon disc 114 through a pair of spherical bearing members 128 and 130, respectively. Electrical connection wires are carried from crystals 124 and 126 through a hollow conduit 132 in the interior of shaft 112. The electrical connections which pass through conduit 132 are connected to conducting members 134 and 136 which are connected through brushes 138 and 140 to external electrical wires 142 and 144.

Figure 10:
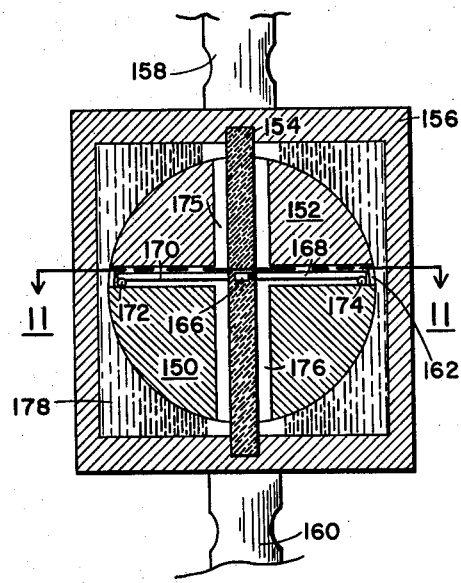
FIGURE 10 is a view, partially in section, of the rotor of a second embodiment of an accelerometer of this invention.
Figure 11:
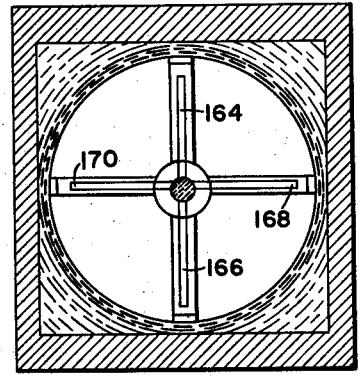
FIGURE 11 is a view, partially in section, taken at 11—11 in FIGURE 10.

The device of FIGURES 10 and 11 utilizes a solid pendulum which is floated in a fluid such as—for example—mercury. Hemisphere 150 is heavier than hemisphere 152. Hemispheres 150 and 152 are supported by support member 154 relative to rotatable chamber means 156. Chamber means 156 is rotated upon shafts 158 and 160. Hemispheres 150 and 152 are separated by washer 162. Piezo-electric crystal members 164, 166, 168 and 170 are cantilevered from support member 154 and are supported relative to hemisphere 150 upon sliding bearing means such as—for example—spherical bearing members 172 and 174. Clearance is provided in hemispherical members 152 and 150 at 175 and 176 to allow spherical members 150 and 152 to rock in response to accelerations at right angles to the axis of support member 154.

Hemisphere 150 is considerably heavier than hemisphere 152 to cause hemisphere 150 to act as a pendulum. The remainder of the chamber means 156 is filled with a fluid 178 such as—for example—mercury.

In operation of the device of FIGURE 1, motor means 18 drives chamber means 10 about the axis of shaft 22 which causes liquid 36 to assume the position shown in the figures. Any rotation of housing 16 about an axis normal to the axis of shaft 22 causes fluid 36 to shift in rotating chamber means 10 to cause probes 32 and 34 to be deflected upward or downward in accordance with the instantaneous position of probes 32 and 34 relative to the axis of rotation of the applied angular velocity. As probes 32 and 34 turn about the axis of shaft 22 they are deflected in a substantially sinusoidal deflection pattern thereby to flex crystals 28 and 30 to generate an electrical voltage which is a sinusoidal voltage, the phase of which is a measure of the position of the axis of applied angular velocity normal to shaft 22, and the amplitude of which is a measure of the amplitude of applied angular velocity about an axis normal to the axis of shaft 22.

Figure 12:
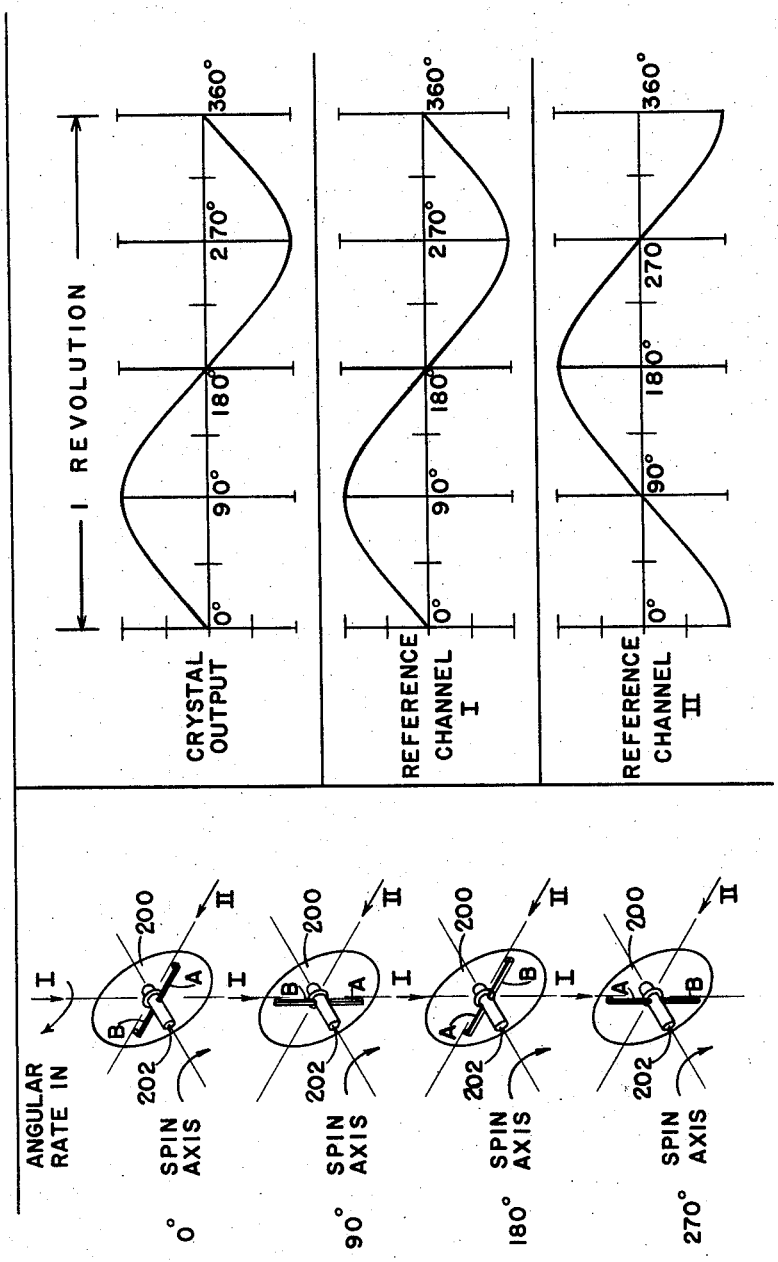
FIGURE 12 is a diagram which is useful to explain the operation of the device of this invention.

Operation of the device of this invention may be understood by referring to FIGURE 12. Disc 200 is the sensing element. Sensing element 200 may be—for example—annular segments as shown in FIGURES 1 and 2, but is shown as a disc. Shaft 202 is a support means for disc 200 and defines the spin axis.

Element 200 utilizes two radially cantilevered piezo-electric crystal voltage generators A and B which sense the axially directed motion of sensing element 200.

The generator, resolver, potentiometer or photoelectric pick-off of the fluid rotor sensor, as for example element 20 of FIGURE 1, generates two reference sinusoidal voltages 90° out of phase with each other. The phase of sinusoidal voltage shown as reference channel I represents angular velocity of the sensor about the reference axis I; whereas the phase of sinusoidal voltage shown as reference channel II represents angular velocity about reference axis II.

Upon spinning the chamber containing both the sensing element and fluid—for example, chamber 10 of FIG. 1—centrifugal forces are established in the fluid which is retained thereby against the side walls of the chamber. Upon the application of an input angular rate about any axis in the plane perpendicular to the axis of fluid rotation, an angle of lag is established between the axis of fluid rotation and the geometrical axis of the chamber. As a result of this angle of lag, the sensing element 200 develops inertial and viscous forces on the fluid. The fluid mass, acting as a gyroscopic body as the result of precession, follows the direction input angular rate. The sensing elements 200 meanwhile, as a result of the developed inertial and viscous forces on the fluid, is set into oscillatory motion. The amplitude of the oscillatory motion is detected by the piezo-electric crystal voltage generators A and B which produce a voltage whose frequency is the same as the frequency of rotation and whose amplitude is directly proportional to the input angular rate. The phase of the crystal output voltage is compared with the phases of the sinusoidal voltages of reference channels I and II. This comparison determines the angular location of the axis of the input angular velocity in relation to the reference axis I and II.

The crystal output voltage plot illustrates a given input angular velocity whose axis is located parallel or coincident to the axis I. It is, of course, understood that input angular velocities having axis differently oriented will result in plots of crystal output voltage having greater or lesser amplitude and different relative phase displacement as here shown than the reference sinusoidal voltages.

The sensitivity and frequency response of the fluid rotor sensor is dependent upon the coupling between the fluid and voltage generating means. Thus, the larger the sensing element the better the sensitivity but the lower the frequency response, whereas the smaller the sensing element the lower the sensitivity but the higher the frequency response.

The sensitivity and frequency response of the sensor is dependent upon the coupling between the fluid voltage generating means. Thus, the larger the sensing element the better the sensitivity response but the lower the frequency response to be realized, whereas the smaller the sensing element the higher the frequency response but with a lower sensitivity.

In the device shown in FIGURES 4, 5, 6 and 7 the disc 86 is deflected by the fluid 85 within chamber means 64. When the housing which supports chamber means 64 is rotated about an axis normal to the axis of crystal members 72 and 74, fluid 85 is deflected to cause disc 86 to wobble to flex crystals 72 and 74 to generate a substantially sinusoidal voltage whose phase is a measure of the position of the axis of applied angular velocity normal to the spin axis of chamber means 64 and whose amplitude is a measure of the amplitude of the angular velocity which is to be measured.

In the device of FIGURES 8 and 9 any acceleration normal to the axis of shaft 112 causes heavy fluid 122 and light fluid 120 to act as a pendulum due to the relationship of the respective centers of gravity to generate an angular rate about an axis normal to a plane formed by the intersection of the axis of shaft 112 and the applied acceleration. Annular disc 114 is tilted relative to the axis of shaft 112 and caused to wobble by rotation of chamber means 100. The wobbling of annular disc 114 causes crystal members 124 and 126 to flex to generate a substantially sinusoidal voltage whose phase is a measure of the direction of acceleration of housing 106 and whose amplitude is a measure of the amplitude of acceleration of housing 106 in a direction normal to the axis of shaft 112.

In the device of FIGURES 10 and 11, housing 156 is rotated. Any acceleration normal to the axis of rotation of housing 156 causes heavy hemisphere 150 to act as a pendulum. When pendulum 150 tips, crystals 164, 166, 168 and 170 are flexed to generate a sinusoidal voltage whose frequency is equal to the frequency of rotation of housing 156, whose phase is a measure of the direction of applied acceleration, and whose amplitude is a measure of the amplitude of applied acceleration.

Figure 13:
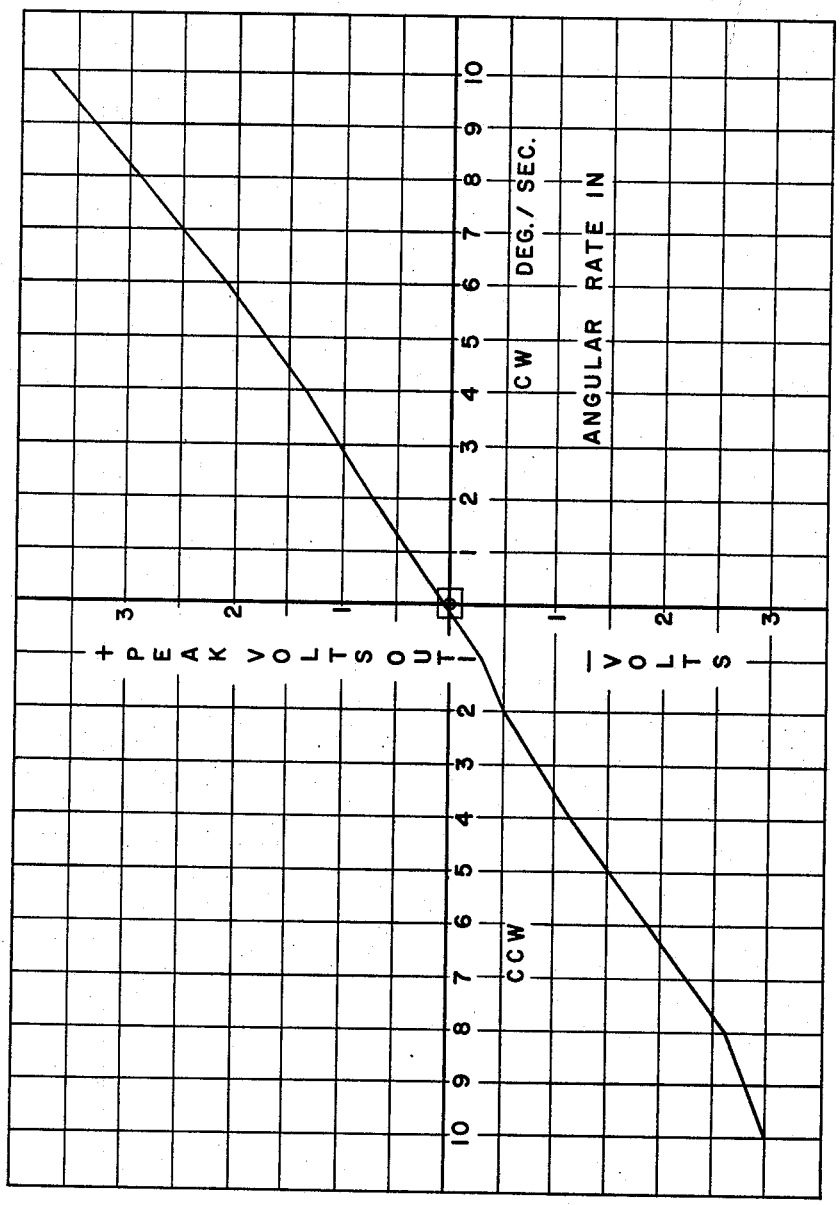
FIGURE 13 is a graph of the response of a typical device in accordance with FIGURES 4, 5, 6 and 7.

When the device of FIGURES 4, 5, 6 and 7 is used as a sensor of angular velocity, a typical plot of the voltage amplitude versus applied angular velocity amplitude is shown in FIGURE 13. It is to be noted that the plot is substantially linear.

Figure 14:
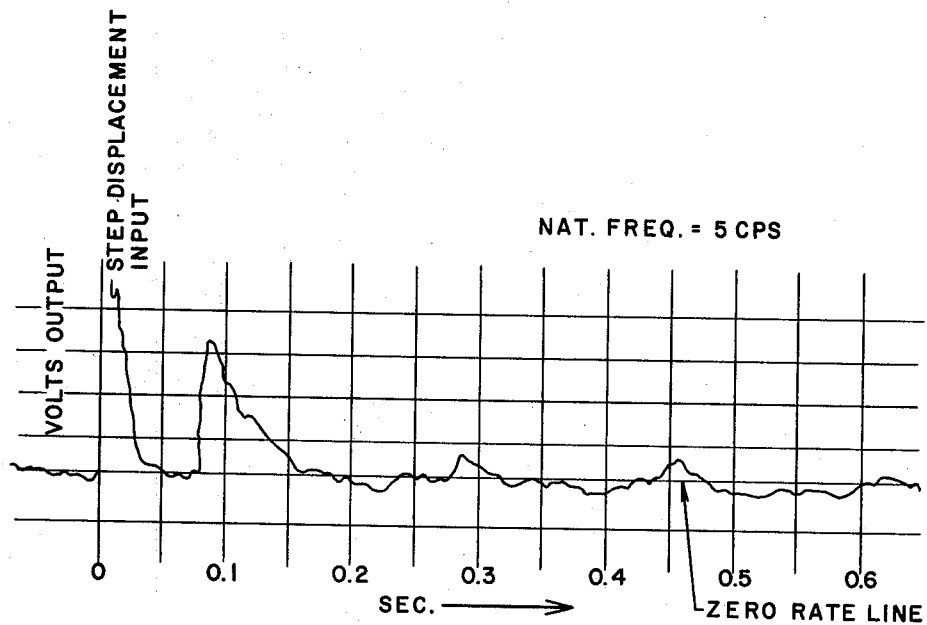
FIGURE 14 is a graph of the response of the device of FIGURES 4, 5, 6 and 7 to a step input.

When a step angular displacement is made about a sensitive axis of the device of FIGURES 4, 5, 6 and 7, the step input of angular velocity generates a voltage amplitude signal as shown in FIGURE 14.

Thus, the device of this invention operates on a hitherto unknown principle. The device of this invention is a sensitive fluid rotor sensor or accelerometer in which mass unbalance does not materially affect the sensing accuracy whereby extreme care and cleanliness in manufacture is not essential.

Although this invention has been particularly described above, it is not intended that it should be limited by the above description, but only in accordance with the spirit and scope of the appended claims.

I claim:
1. In combination: a rigid axial member; a pair of oppositely directed, radially extending piezo-electric crystals, cantilevered to said axial member; vane means attached to said crystals and having a surface in the shape of a substantially ninety degree segment of an annulus in a plane which is, in its unexcited position, normal to the axis of said axial member adapted to detect the gyroscopic precession established by the interaction of forces between members rotating about axes in perpendicular relationship to one another and to generate a voltage therefrom which is the measure of the angular rate imposed on one of said rotating members.

2. In combination: means forming a closed spherical, rotatable chamber having a spin axis oriented in a predetermined direction; driving means to spin said chamber about said spin axis; a rigid axial support member coaxial with said spin axis and passing through said chamber; an annular motion-detecting disc means, symmetrically positioned around said axial support member; first flexible fluid-tight membrane means positioned between the inner edge of said annular disc and said rigid axial member; second flexible fluid-tight membrane means connected between the outer edge of said annular disc and the inner wall of said rotatable chamber; two different liquids positioned on opposite faces of said disc and said membrane members and filling said chamber, one said liquid being heavier than the other said liquid; motion-sensing means extending radially from said axial member and communicating with said disc means whereupon application of acceleration in a plane normal to the said spin axis, after the said chamber is in rotation, establishes an oscillation on the motion detecting disc means relative to said axial member to generate an electrical signal which is a measure of said acceleration.

3. A device as recited in claim 2 and further comprising: a housing; bearing means positioned upon said housing to support said means forming a closed rotatable chamber for rotation about its spin axis; said driving-means positioned between said housing and said means forming a closed rotatable chamber to spin said means forming a closed rotatable chamber about its axis; and means for sensing the oscillation of the said motion detecting means contained in the means forming a closed rotatable chamber imposed thereon by acceleration of said housing in a direction perpendicular to the said spin axis.

4. In combination:
(a) a rigid axial support member;
(b) annular motion detecting disc means substantially symmetrical positioned around said axial support member;
(c) a first pair of oppositely positioned radially directed cantilevered electric crystals extending from said axial member;
(d) bearing means contacting a first side of said motion detecting disc means and supporting said free ends of said crystal;
(e) a second pair of oppositely directed, radially extending cantilevered piezo-electric crystals extending from said axial member;
(f) bearing means contacting a second side of said motion detecting disc means and supporting the ends of said second pair of crystals at a circumferential position which is 90° removed from the contact between said first mentioned bearing means and said motion detecting disc means,
said piezo-electric crystals mechanically flexed by the respective bearing means in response to angular displacement of said motion detecting disc means relative to said axial support member and generating an electric signal as a result of the mechanical flexure.

5. In combination:
(i) a housing means;
(ii) a closed chamber means;
    (a) a rigid axial support member passing through said chamber means and being mounted for rotation relative to said housing means
    (b) an annular motion detecting disc means positioned about said axial support member;
    (c) motion sensing means extending radially from said axial support member and communicating with said annular motion detecting disc means;
    (d) a fluid in said closed chamber means
said motion sensing means generating an electrical signal in response to angular displacement of said motion detecting disc means relative to said axial support member imposed by the resultant forces established within the chamber by the precession of the centrifugally oriented fluid caused by an angular rate applied to the said housing means which is in perpendicular realtionship to the said axial support member.

6. The combination of claim 5 wherein said angular motion detecting disc means is connected
   (x) to said axial support member by a first flexible member, and
   (y) to the inner surface of said closed chamber means by a second flexible member.

7. The combination of claim 6 wherein said motion sensing means are comprised of piezo-electric crystals.

8. In combination:
   (a) a first support means;
   (b) a closed chamber means having an axial support means passing therethrough, said chamber means being mounted for rotation about the axis of said axial support means relative to said first support means, said chamber means having its spin axis coaxial with the axis of said axial support means, said spin axis being oriented in a predetermined direction;
   (c) a liquid at least partially filling said chamber means
   (d) driving means to spin said chamber means and said liquid about said spin axis;
   (e) a first motion detecting member having a substantially hemispherical shape and having a passage therethrough perpendicular to the base of said first motion detecting member and coaxial with the center of said base, said first motion detecing member being positioned in said chamber with said axial support member passing through said passage;
   (f) a second motion detecting member having a substantially hemispherical shape and having a passage therethrough perpendicular to the base of said second motion detecting member and coaxial with the center of said second mentioned base, said second motion detecting member being positioned in said chamber with said axial support member passing through said second mentioned passage, wherein the base of said second motion detecting member is disposed opposite the base of said first motion detecting member; said first and second motion detecting members differing with respect to each other in specific gravity;
   (g) a spacing means positioned between the basis of said first and said second motion detecting members to hold said first and said second motion detecting members in spaced apart relationship and to provide a clearance therebetween;
   (h) motion sensing means extending radially from said axial support member and having free ends extending into said clearance and communicating with said motion detecting means, said motion sensing means generating an electrical signal in response to variation of angular displacement of said chamber about an axis perpendicular to said axial support member whereby an acceleration imparted to the first support means in a direction normal to the axis rotation of said chamber means will precess the said first and second motion detecting means with the result that the oscillating motion relative to the axis of the axial support means imparted by the said first and second motion detecting means causes the motion sensing means to generate an electric signal having an amplitude directly proportional to the imposed acceleration.

9. The combination of claim 8 and in addition
   (i) bearing means positioned between the base of one of said hemispherically shaped motion detecting members and said free ends of said motion sensing means.

10. The combination of claim 9 wherein said first motion detecting member is heavier than said second motion detecting member.

11. The combination of claim 9 wherein said motion sensing means comprises a plurality of piezo-electric crystals.

12. The combination of claim 9 wherein said motion detecting means is comprised of two pairs of piezo-electric crystals and wherein the members of each said pair are substantially coaxial, and further wherein one pair of said piezo-electric crystals extends from the axial support member at right angles to the other one of said pairs.

13. The combination of claim 9 and in addition
   (j) position sensing means being positioned to detect the angular position of said chamber means about said spin axis relative to said first support means.

14. In combination: means adapted to be supported within a rotatable member forming a closed rotatable chamber having a spin axis oriented in a predetermined direction; said chamber being at least partially filled with liquid; driving means to spin said chamber and liquid about said spin axis; at least one mechanical motion detecting probe means directed, when in its unexcited position in a fixed circumferential position transversely to said spin axis, and extending into the liquid during rotation of said chamber about its spin axis; support means, positioned within said chamber, attached flexibly to support and to sense the deflection of the said probe means about axes normal to the said spin axis, said probe detecting means sensing the angle of lag between the axis of liquid rotation and the geometric spin axis of the chamber caused by the precession of the liquid resulting from an angular velocity imposed upon the first mentioned means, which angular velocity is about an axis perpendicular to the spin axis of the said chamber, whereupon the support means generates an electrical signal which is a measure of the imposed angular velocity.

15. In combination: A housing means; a closed chamber means having an axial support means passing therethrough, said chamber means being mounted for rotation about the axis of said axial support means relative to said housing means, said chamber means having a spherical inner surface and having its spin axis coaxial with said axial support means, said spin axis being oriented in a predetermined direction; mercury at least partially filling said chamber means; driving means to spin said chamber means and mercury about said spin axis; a plurality of paddle shaped motion detecting means in said chamber means with flat surfaces normal to said spin axis in the unexcited state, said motion detecting means comprising at least one pair of radially opposite, annular segments adapted to extend into said mercury when said chamber is spun about the said spin axis, the said radially opposite annular segments connecting the said axial support means and the said motion detecting means, said radially opposite annular segments being flexible and adapted to generate an electrical signal in response to reciprocating forces established by the interaction of forces resulting from an angular rate applied to said housing means in direction perpendicular to the spin axis and the centrifugally oriented mercury in said chamber; and, position sensing means to generate, in response to the electrical signal of the said radially opposite annular segment, a voltage having the frequency of the rotation of the said chamber and an amplitude proportional to the angular rate.

16. In combination: a housing means; a closed chamber means having an axial support means passing therethrough, said chamber means being mounted for rotation about the axis of said axial support means relative to said housing means, said chamber means having a spherical inner surface and having its spin axis coaxial with said axial support means, said spin axis being oriented in a predetermined direction; fluid at least partially filling the said chamber means; driving means to spin said chamber means and the fluid about said spin axis; a plurality of paddle shaped motion detecting means with flat surfaces normal to said spin axis in the unexcited state, said paddle shaped motion detecting means being radially opposite, annular segments, adapted to extend into said mercury when said chamber is spun about the said spin axis; piezo-electric crystals connecting said axial support means and the said motion detecting means, the said piezo-electric crystals positioned to detect the resultant forces established by the interaction of forces resulting from an angular rate applied perpendicular to the spin axis within the said housing and the centrifugally oriented mercury in said chamber; and position sensing means to generate, in response to the electrical signal of the said motion sensing means, a voltage having the frequency of the rotation of the said chamber and an amplitude proportional to the angular rate.

17. In combination: a housing means; a spherical chamber means rotatably mounted within said housing means about an axial member means passing therethrough; mercury at least partially filling said spherical chamber means; driving means to spin said chamber about its axial member means; a plurality of motion detecting means positioned to extend into said mercury when centrifugally oriented and each comprising piezo-electric crystal means communicating with said axial member means; radial structural means positioned normal to the axial member means to support the said piezo-electric crystal means, the said piezo-electric crystal means in response to the reciprocating motion of the said radial structural means resulting from the precession imposed upon the centrifugally oriented mercury by an applied angular rate perpendicular to the said axial member generate a voltage having an amplitude directly proportional to the amplitude of the applied angular rate; and, position sensing means to amplify the voltage output of the said piezo-electric crystal means.

18. In combination: a housing means; a spherical chamber means rotatably mounted within said housing means about an axial member means passing therethrough; liquid at least partially filling said spherical chamber means; motor means to spin said chamber about its axial member means; at least one mechanically cylindrical motion detecting means directed when in its unexcited position transversely to said spin axis and positioned to extend into said liquid when centrifugally oriented, the said cylindrical motion detecting means, each having a fixed circumferential position about said spin axis, and each comprised of a radially extending motion sensing means connecting the said axial member means and the said cylindrical motion detecting means, the said radially extending motion sensing means being flexible and adapted to generate an electric signal in response to reciprocating motion relative to the axial member means thereon resulting from the precession of the centrifugally oriented liquid upon the application of an angular rate imposed on said housing means in a direction perpendicular to the axis of rotation of said spherical chamber means; and, position sensing means to amplify the voltage output of the said radially extending motion sensing means.

19. In combination: a housing means; a spherical chamber means rotatably mounted within said housing means about an axial member means passing therethrough; liquid at least partially filling said spherical chamber means; motor means to spin said chamber about its axial member means; at least one mechanically cylindrical motion detecting means directed when in its unexcited position transversely to said spin axis and positioned to extend into said liquid when centrifugally oriented, the said cylindrical motion detecting means, each having a fixed circumferential position about said spin axis, and each comprised of piezo-electric crystal means connecting the said axial member means and the said cylindrical motion detecting means, the said piezo-electric crystal means being flexible and adapted to generate an electric signal in response to reciprocating motion relative to the axial member means thereon resulting from the precession of the centrifugally oriented liquid upon the application of an angular rate imposed on said housing means in a direction perpendicular to the axis of rotation of said spherical chamber means; and, position sensing means to amplify the voltage output of the said piezo-electric crystal means.

20. In combination: a housing means; a spherical chamber means rotatably mounted within said housing means about an axial member means passing therethrough; mercury at least partially filling said spherical chamber means; driving means to spin said chamber about its axial member means; a cylindrical motion detecting means positioned to extend into said mercury when centrifugally oriented and each comprising piezo-electric crystal means communicating with said axial member means; radial structural means positioned normal to the axial member means to support the said piezo-electric crystal means, the said piezo-electric crystal means in response to the reciprocating motion of the said radial structural means resulting from the precession imposed upon the centrifugally oriented mercury by an applied angular rate perpendicular to the said axial member generate a voltage having an amplitude directly proportional to the amplitude of the applied angular rate; and, positioned sensing means to amplify the voltage output of the said piezo-electric crystal means.

References Cited in the file of this patent
UNITED STATES PATENTS

| | | |
|---|---|---|
| 1,841,606 | Kollsman | Jan. 19, 1932 |
| 1,890,831 | Smyth | Dec. 13, 1932 |
| 2,045,404 | Nicholides | June 23, 1936 |
| 2,488,586 | Diemer | Nov. 22, 1949 |
| 2,605,093 | Dorand | July 29, 1952 |
| 2,716,893 | Birdsall | Sept. 6, 1955 |
| 2,880,333 | Dranetz | Mar. 31, 1959 |
| 2,898,477 | Hoesterey | Aug. 4, 1959 |
| 2,928,667 | Peterson | Mar. 15, 1960 |
| 2,949,780 | Williams | Aug. 23, 1960 |
| 2,949,782 | Stedman | Aug. 23, 1960 |
| 2,949,784 | Maeder | Aug. 23, 1960 |
| 2,953,925 | Yeadon | Sept. 27, 1960 |
| 3,014,374 | Johnston | Dec. 26, 1961 |
| 3,028,760 | Diamond | Apr. 10, 1962 |